(12) United States Patent
Wackerly

(10) Patent No.: US 10,104,000 B2
(45) Date of Patent: Oct. 16, 2018

(54) REDUCING CONTROL PLANE OVERLOAD OF A NETWORK DEVICE

(71) Applicant: HEWLETT PACKARD ENTERPRISE DEVELOPMENT LP, Houston, TX (US)

(72) Inventor: Shaun Wackerly, London, KY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 81 days.

(21) Appl. No.: 15/420,286

(22) Filed: Jan. 31, 2017

(65) Prior Publication Data

US 2018/0219788 A1    Aug. 2, 2018

(51) Int. Cl.
| | | |
|---|---|---|
| *H04L 12/833* | (2013.01) | |
| *H04L 12/721* | (2013.01) | |
| *H04L 12/26* | (2006.01) | |
| *H04L 12/825* | (2013.01) | |
| *H04L 12/801* | (2013.01) | |

(52) U.S. Cl.
CPC .............. *H04L 47/31* (2013.01); *H04L 43/08* (2013.01); *H04L 45/38* (2013.01); *H04L 43/0888* (2013.01); *H04L 43/0894* (2013.01); *H04L 43/16* (2013.01); *H04L 47/18* (2013.01); *H04L 47/25* (2013.01)

(58) Field of Classification Search
CPC ......... H04L 47/31; H04L 43/08; H04L 45/38; H04L 47/25; H04L 47/18; H04L 43/0894; H04L 43/0888; H04L 43/16
See application file for complete search history.

(56) References Cited

U.S. PATENT DOCUMENTS

| | | | |
|---|---|---|---|
| 8,593,958 B2 | 11/2013 | Zhang | |
| 8,730,806 B2 | 5/2014 | Zhang et al. | |
| 9,306,840 B2 * | 4/2016 | Puttaswamy Naga | ....................... H04L 45/42 |
| 9,473,404 B2 * | 10/2016 | Anand | ..................... H04L 45/38 |
| 9,497,207 B2 * | 11/2016 | Dhawan | ............. H04L 63/1441 |
| 9,503,344 B2 * | 11/2016 | Chakrabarti | ........ H04L 43/0852 |
| 9,832,040 B2 * | 11/2017 | Sun | ..................... H04L 12/4645 |
| 2012/0020361 A1 | 1/2012 | Ueno | |
| 2013/0318255 A1 | 11/2013 | Karino | |
| 2015/0117202 A1 | 4/2015 | Bhagavathiperumal et al. | |
| 2015/0350156 A1 | 12/2015 | Ma et al. | |

(Continued)

OTHER PUBLICATIONS

Othman Othman M.M. and Koji Okamura, "Design and Implementation of Application Based Routing Using OpenFlow," Jun. 2010, pp. 1-8, CF1'10, Seoul, Korea, ACM.

(Continued)

*Primary Examiner* — Brian O'Connor
(74) *Attorney, Agent, or Firm* — Hewlett Packard Enterprise Patent Department

(57) ABSTRACT

Example implementations relate to reducing control plane overload of a network device. In an example, a non-transitory computer-readable storage medium may store instructions that, when executed by a processor of an SDN controller, cause the SDN controller to track packet-in messages received from a controlled switch and, if a rate of packet-in messages received from the controlled switch exceeds a threshold, send a flow rule to the controlled switch to divert a subset of unmatched flows to a non-SDN forwarding pipeline of the controlled switch.

15 Claims, 4 Drawing Sheets

(56) References Cited

U.S. PATENT DOCUMENTS

| | | | |
|---|---|---|---|
| 2016/0142427 A1* | 5/2016 | de Los Reyes | H04L 63/1441 726/23 |
| 2016/0381069 A1* | 12/2016 | Chesla | H04L 45/74 726/23 |
| 2018/0013787 A1* | 1/2018 | Jiang | H04L 63/1458 |
| 2018/0145902 A1* | 5/2018 | Grosso | H04L 45/38 |

OTHER PUBLICATIONS

Roberto Bifulco et al., "Improving SDN with Inspired Switches," Mar. 14, 2016, pp. 1-12, SOSR'16, Santa Clara, CA, USA, ACM.

* cited by examiner

REDUCING CONTROL PLANE OVERLOAD OF A NETWORK DEVICE

BACKGROUND

Networks can include a plurality of resources connected by network devices (e.g., switches) and communication links. An example network can include a software defined network (SDN). A software defined network can include an SDN controller and multiple SDN-enabled network devices. The SDN-enabled network devices may have both an SDN forwarding pipeline for forwarding traffic in accordance with instructions from the SDN controller as well as a non-SDN forwarding pipeline for forwarding traffic in accordance with pre-configured forwarding rules not received from the SDN controller.

DETAILED DESCRIPTION

Figure 1:
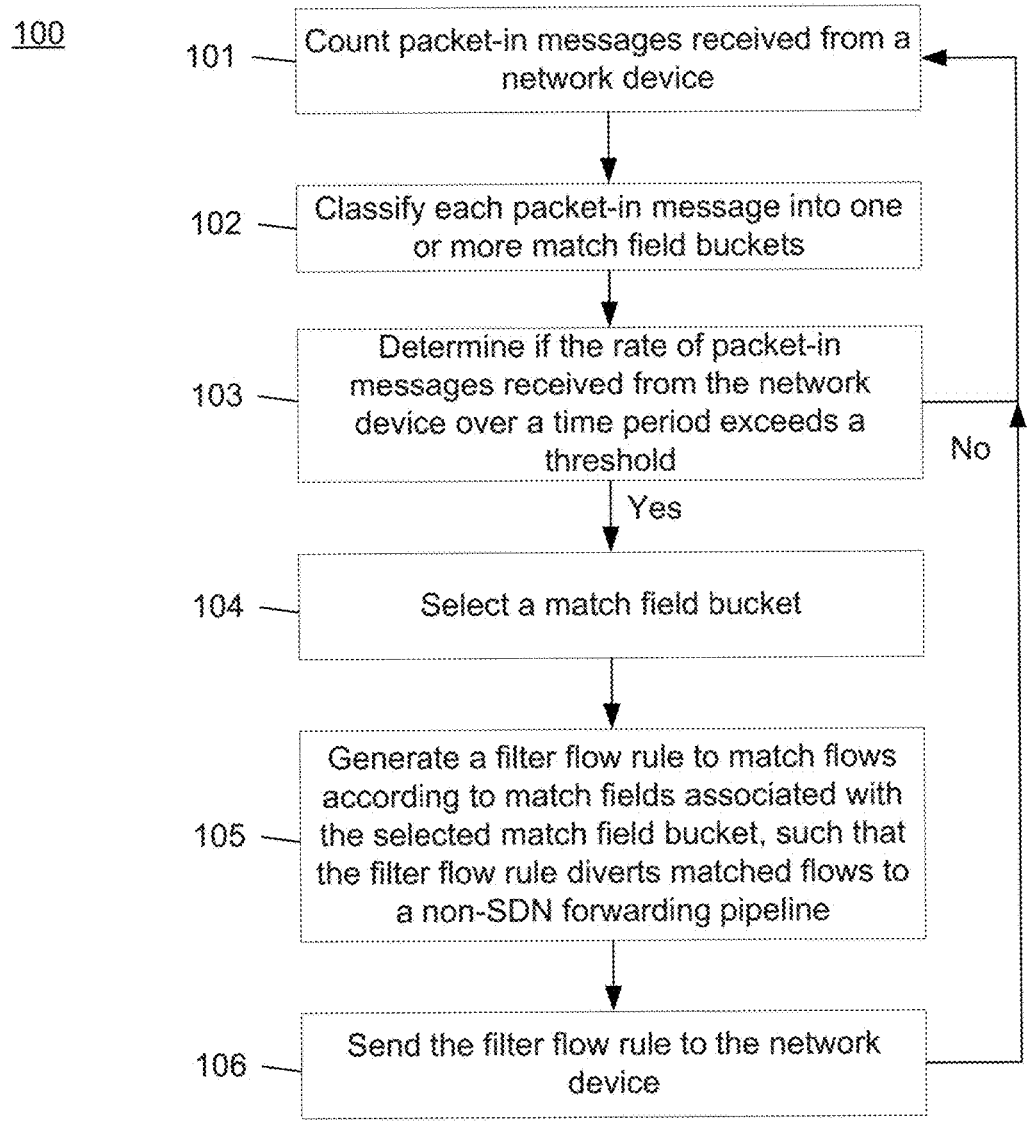
FIG. 1 illustrates a flow chart of an example method for reducing control plane overload of a network device, according to an example.

An SDN network may include an SDN controller and multiple SDN-enabled network devices, such as network switches. The SDN controller and SDN-enabled devices may communicate in accordance with an SDN protocol, such as the OpenFlow protocol. The SDN-enabled network devices may include two forwarding pipelines.

A first forwarding pipeline may be an SDN forwarding pipeline. The SDN forwarding pipeline may include flow tables containing flow rules received from the SDN controller. A flow rule may include one or more match fields for matching network traffic to the flow rule and instructions or actions instructing the network device how to process network traffic flows (which comprise packets) matching the flow rule. For example, the instructions/actions may designate appropriate forwarding behavior (e.g., forward matched packets out port X). The network device may forward traffic in accordance with these flow rules.

A second forwarding pipeline may be a non-SDN forwarding pipeline. The SDN forwarding pipeline can divert packets to the non-SDN forwarding pipeline. The non-SDN forwarding pipeline may include a forwarding table that allows the network device to match network traffic and determine the appropriate forwarding behavior for the matched traffic. However, the forwarding table of the non-SDN forwarding pipeline is not populated by the SDN controller. Rather, the non-SDN forwarding pipeline is pre-configured with forwarding tables, such as by a network administrator and/or by virtue of network protocols that the network device executes to build its forwarding tables. The non-SDN forwarding pipeline can thus be considered relatively static.

In contrast, the SDN controller may dynamically alter the SDN forwarding pipeline by sending new flow rules to the network device at any time. For example, if the network device cannot determine the appropriate forwarding behavior for a received packet (i.e., there is no flow entry that matches the packet), the network device may forward the packet to the SDN controller, for example, as a specially encapsulated packet. In the OpenFlow protocol, to be described in more detail below, such a packet is referred to as a "packet-in message", which terminology will be used herein. The SDN controller may receive the packet-in message, determine the appropriate forwarding behavior for the packet, and then send a new flow rule to the network device so that future packets with the same match criteria may be matched to the new rule and forwarded appropriately. The control plane of the network device, which includes a processor, is responsible for creating the packet-in messages by adding appropriate headers to any unmatched packets.

If the network device receives a large number of unmatched packets, the control plane of the network device may be overburdened. For example, the control plane processor of the network device may have to spend a large proportion of processing time and resources to generate the packet-in messages for sending to the SDN controller. This added control plane strain may cause network issues because too much of the network device's control plane processor is consumed by packet-in processing and not enough may be available for other control plane functions, such as running various network protocols used to keep the network running properly (e.g., spanning tree protocol (STP), open shortest path first (OSPF) protocol, etc.). On the other hand, it may nonetheless be desirable to maximize the proportion of traffic that is handled by the SDN forwarding pipeline even though it may cause an increased burden on the control plane of the network device. For example, some benefits of SDN are that it permits dynamic network behavior, is able to handle new traffic flows and adjust to changing traffic patterns, and it is able to implement new network policies related to quality of service or network security.

Example implementations relate to reducing control plane overload of a network device. An example method may be performed by an SDN controller. The controller counts packet-in messages received from a switch. The switch may have both an SDN forwarding pipeline and a non-SDN forwarding pipeline. The controller classifies each packet-in message into a match field bucket. The match field bucket matches network flows based on at least one field of the packet-in message. If the rate of packet-in messages received from the switch over a time period exceeds a threshold, the controller selects a match field bucket and generates a filter flow rule to match flows according to the at least one field associated with the match field bucket. The filter flow rule causes any matched flows to be diverted to a non-SDN forwarding pipeline of the switch. The controller then sends the filter flow rule to the switch.

An example controller in a software defined network (SDN) may include a global counter to count a number of packet-in messages received from a controlled switch. The controller may also include multiple match field bucket counters each with match conditions. Each match field bucket counter counts the number of packet-in messages received from the controlled switch that match the match conditions. The controller may also include a balancer to, in response to a rate of packet-in messages exceeding a threshold, select a match field bucket and generate a filter flow rule. The generated filter flow rule is generated to have the match conditions of the selected match field bucket and an action to divert any matching packets to a non-SDN forwarding pipeline of the controlled switch. The controller may include a communication module to send the filter flow rule to the controlled switch.

An example non-transitory computer-readable storage medium may store instructions for reducing control plane overload of a controlled switch. When the instructions are executed by a processing resource of an SDN controller they cause the SDN controller to track packet-in messages received from a controlled switch and, if a rate of packet-in messages received from the controlled switch exceeds a threshold, send a flow rule to the controlled switch to divert a subset of unmatched flows to a non-SDN forwarding pipeline of the controlled switch.

As a result of these implementations and techniques, the control plane overload on a network device caused by the processing of many packet-in messages may be reduced while still allowing the network device to process and forward network traffic. The reduced control plane overload may allow for better functioning of the network device within the network, which may contribute to more network stability and speed. Additionally, these techniques may allow the network device to still default to processing network traffic using its SDN forwarding pipeline rather than the non-SDN forwarding pipeline. Additional details, advantages, and the like are described below.

Figure 2:
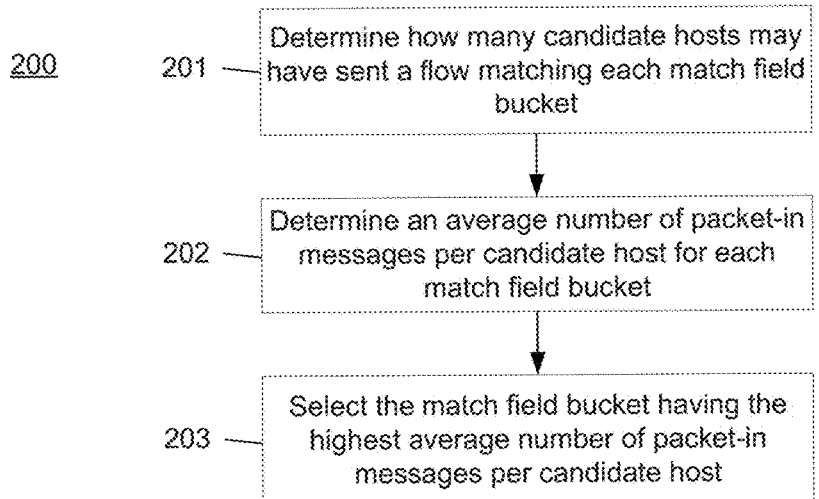
FIG. 2 illustrates a flow chart of an example method for reducing control plane overload of a network device, according to an example.
Figure 3:
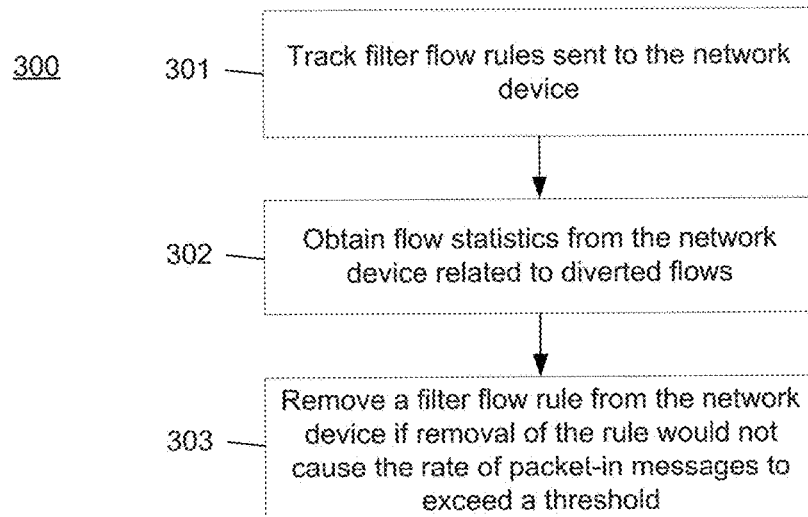
FIG. 3 illustrates a flow chart of an example method for reducing control plane overload of a network device, according to an example.

FIGS. 1-3 illustrate methods to reduce control plane overload of a network device, according to an example. Methods 100-300 may be performed by a computing device, computer, server, or the like, such as SDN controller 410 or computer 510. Computer-readable instructions for implementing methods 100-300 may be stored on a computer readable storage medium. These instructions as stored on the medium are referred to herein as "modules" and may be executed by a processing resource.

Figure 4:
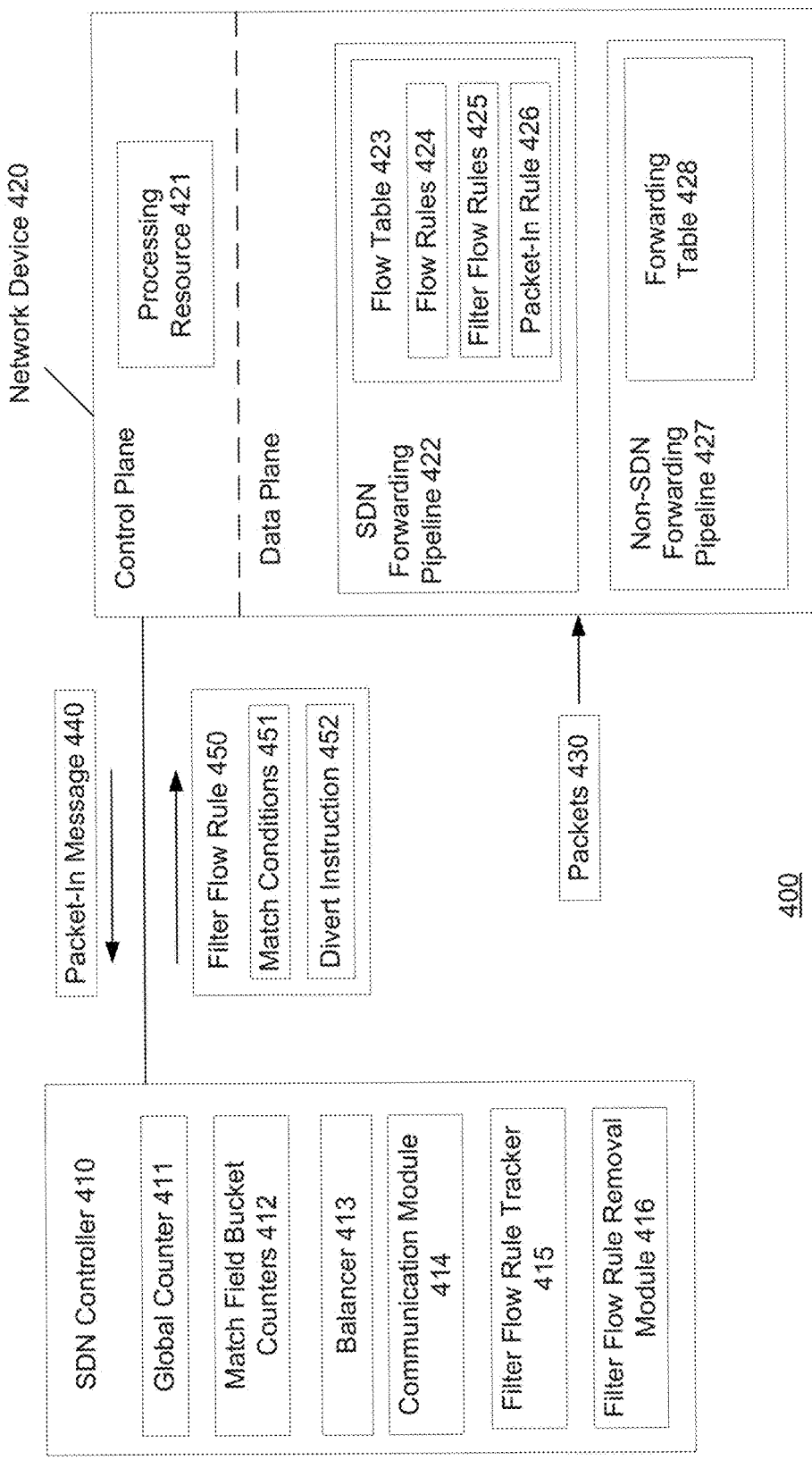
FIG. 4 illustrates an example environment with a device for reducing control plane overload of a network device, according to an example.

Methods 100-300 will be described here relative to environment 400 of FIG. 4. Environment 400 may include SDN controller 410 and network device 420. SDN controller 410 may be a computer configured to manage the control plane of a software defined network. SDN controller 410 may include/be implemented by one or multiple computers. Network device 420 may be network infrastructure devices, such as a switch (layer 2 or multilayer) or router, of the software defined network. The network device 420 may thus be part of the data plane of the software defined network, which may include multiple network devices.

SDN controller 410 may communicate with network device 420 via an SDN protocol, such as the OpenFlow protocol. SDN controller 410 may program rules in flow tables of network device 420, such as flow table 423. Network device 420 may use these rules to process and forward network traffic. The flow tables may be implemented by multiple hardware elements (e.g., Tertiary Content Addressable Memory (TCAM), Application Specific Integrated Circuit (ASIC)) within network device 420, and each flow table may include multiple tables. In addition to its SDN forwarding pipeline 422, network device 420 also includes a non-SDN forwarding pipeline 427 with a forwarding table 428 for forwarding network traffic in accordance with other, non-SDN network protocols. Network device 420 thus can be referred to as a hybrid SDN device because it supports both SDN forwarding and traditional, non-SDN forwarding. Additionally, a variety of SDN applications may run on or interface with SDN controller 410. These SDN applications may be part of the application plane of the software defined network.

SDN controller 410 and network device 420 may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, SDN controller 410 and network device 420 may include one or more machine-readable storage media separate from the one or more processing resources, as well as additional hardware elements, such as TCAMs and ASICs.

Turning to FIG. 1, method 100 may be used to reduce control plane overload of a network device (e.g., network device 420), according to an example. Network device 420 may be connected to multiple devices in the network and may receive packets 430 from these devices. These packets may be ingressed to the SDN forwarding pipeline 422 of network device 420. SDN forwarding pipeline 422 may have one or more flow tables 423. The flow table 423 may include multiple flow rules 424 (also referred to as "flow entries"). Each flow rule has, among other things, match fields, action fields, and a priority. The match fields provide parameters for matching network packets to the flow table rule. The match parameters may be a source or destination address, for example. The action field specifies what do with a matching packet, including which port in the network device 420 to forward the packet (referred to as the destination port). The priority specifies the priority of the rule so that it is clear which rule should be executed if there are multiple matching rules. The flow rules 424 may be organized in flow table 423 according to the priorities so that higher priority rules appear first in the flow table 423. As mentioned previously, the SDN controller 410 is responsible for sending flow rules to network device 420 for installation in flow table 423.

Flow table 423 may also include filter flow rules 425, which will be described later. Flow table 423 may also include a packet-in rule 426. The packet-in rule 426 may be the lowest priority rule in the flow table 423 so that it is only executed if there are no other matches. The packet-in rule 426 may include "wildcard" match parameters allowing for a match to any received packet. The action field of the packet-in rule 426 directs the SDN forwarding pipeline 422 to forward the received packet to the control plane of the network device 420 for packet-in processing by processing resource 421. Processing resource 421 adds packet-in headers to the received packet to create a packet-in message 440. Network device 420 then forwards the packet-in message 440 to the SDN controller 410 (which is responsible for managing network device 420). SDN controller 410 receives the packet-in packet and determines how network device 420 should process the packet. SDN controller 410 then generates a flow rule with appropriate match fields, action field, and priority. The action field specifies the processing behavior that SDN controller 410 determined that network device 420 should apply to the packet encapsulated in the packet-in message. For example, the desired forwarding behavior may be dropping the packet or forwarding the packet to a particular port. SDN controller 410 then sends the generated flow rule to network device 420, which adds the new flow rule to its flow table 423. Accordingly, if network device 420 receives another packet with the same match parameters as the original packet that underwent packet-in processing, the newly received packets will match the newly installed flow rule and can thus be processed by the network device 420 without consulting SDN controller 410. Additionally, SDN controller 410 may send the packet encapsulated in the packet-in message towards its destination (as a "packet-out message" in OpenFlow), so that network device 420 does not need to do anything further for that packet.

When network device 420 is using the SDN forwarding pipeline 422 for processing packets, it will undergo the packet-in processing routine any time a packet is received that does not match any of the flow rules 424. If a large number of packets are forwarded to the control plane for packet-in processing, processing resource 421 can be strained/overburdened/overloaded by having to generate the associated packet-in messages. This strain can cause network issues by consuming resources and processing time of processing resource 421, preventing it from performing other functions to keep the network running, such as executing network protocols like Spanning Tree Protocol (STP) and Open Shortest Path First (OSPF) protocol. Another potential consequence/effect is that management of the network device may be disrupted because the control plane of the network device is too busy to deal with the management requests.

During a steady state condition in the network the impact may be relatively low. However, some conditions may cause many new network flows (with associated packets) to be added to the network in a short period of time, thus potentially overloading the control plane with packet-in processing. Some examples of these conditions or events are network device reboot (resulting in flow tables being cleared), topology change in the network (resulting in existing network flows being redirected), a network event resulting in a large number of new flows being added (e.g., the start of school—and thus the arrival of many new network users—for a campus network at a university), a network attack (e.g., a virus causing increased traffic load and spoofed IP sources), or a firmware defect in a network device.

Accordingly, it would be useful to reduce the control plane overload on network device 420 when it is inundated with packet-in message processing. Method 100 may be used for this purpose and can be performed by SDN controller 410. At 101, the SDN controller 410 may count packet-in messages 440 received from network device 420. SDN controller 410 may count the packet-in messages 440 using global counter 411, which may be implemented using hardware counters and/or software counters. By counting packet-in messages received, SDN controller 410 can determine a rate of packet-in messages received from network device 420 over a period of time. The period of time may be a sliding window period of time. SDN controller 410 can use this rate to determine if network device 420 is overtaxed with packet-in processing. SDN controller 410 also may receive statistics on a periodic basis from network device 420 and/or may poll network device 420 for such statistics, which may include a consumption level of processing resource 421. Such information may also be used to determine whether network device 420 is overstressed, and further may be used to determine correlations between the packet-in rate and the consumption level of processing resource 421.

At 102, SDN controller 410 may classify each packet-in message into one or more match field buckets. The match field buckets may each count/keep track of how many packet-in messages have been classified therein, such as using match field bucket counters 412. Each match field bucket is a distinct combination of one or more match fields and associated values for the match fields. Note that it is not required that match field buckets be generated for all possible match field combinations and values. Rather, the match field buckets may be generated (as described below) to the extent desirable by the person pre-generating the buckets or by the person programming the algorithm for automatically generating the buckets.

The candidate match fields for generating match field buckets may be any match fields that are supported by the SDN protocol implemented by SDN controller 410 and network device 420. For example, if the OpenFlow protocol is being implemented, the candidate match fields for generating the buckets are those match fields supported by the version of the OpenFlow specification being implemented by SDN controller 410 and device 420. Example match fields include the following:

IN_PORT
ETH_SRC
ETH_TYPE
IPV4_SRC
UDP_DST
ARP_OP
ARP_SHA
ICMPV6_TYPE
ICMPV6_CODE
MPLS_LABEL.

The match field combinations could be pre-generated or generated dynamically as packets are received. Some fields, such as ETH_TYPE, can be omitted from a combination where that field could be assumed. For example, the combination IN_PORT, IPV4_SRC is essentially identical to the combination IN_PORT, IPV4_SRC, ETH_TYPE=IPv4 (where IPv4 is the "value" for ETH_TYPE, as explained below). Thus, such redundant combinations could be reduced to the simpler combination (here, IN_PORT, IPV4_SRC). Such redundancies may be outlined in the protocol specification, as is the case for the current OpenFlow specification.

Example match field combinations based on the above example match fields include the following:
 IN_PORT
 IN_PORT,ETH_SRC,ETH_TYPE
 IN_PORT,ETH_SRC,IPV4_SRC
 IN_PORT,IPV4_SRC,UDP_DST
 IN_PORT,ARP_OP
 ARP_OP,ARP_SHA
 ICMPV6_TYPE, ICMPV6_CODE
 MPLS_LABEL As mentioned previously, the match field buckets themselves would include both a combination of match fields and specific values for those match fields. Then, the underlying packets in packet-in messages would be matched to as many match field buckets as possible. A match would exist when the packet contained the same match fields and values within those match fields as present in the match field bucket. Example match field buckets based on the above match field combinations include the following (where a.i is a first match field bucket, a.ii is a second match field bucket, b.i is a third match field bucket, etc.):
 a. IN_PORT
  i. IN_PORT=5
  ii. IN_PORT=11
 b. IN_PORT,ETH_SRC,ETH_TYPE
  i.  IN_PORT=11,ETH_SRC=001122-334455, ETH_TYPE=IPv4
  ii. IN_PORT=11,ETH_SRC=002244-668800, ETH_TYPE=IPv4
 c. IN_PORT, ETH_SRC, IPV4_SRC
  i.  IN_PORT=11,ETH_SRC=001122-334455, IPV4_SRC=99.0.0.1
 d. IPV4_SRC
  i. IPV4_SRC=99.0.0.1
 e. IN_PORT,IPV4_SRC,UDP_DST
  i. IN_PORT=11, IPV4_SRC=99.0.0.1, UDP_DST=53
  ii. IN_PORT=11 IPV4_SRC=99.0.0.1 UDP_DST=66
 f. IN_PORT,ARP_OP
  i. IN_PORT=11,ARP_OP=Req
 g. ARP_OP,ARP_SHA
  i. ARP_OP=Req,ARP_SHA=99.0.0.1
 h. ICMPV6_TYPE,ICMPV6_CODE
  i. ICMPV6_TYPE=133 (router solicitation)
 i. MPLS_LABEL
  i. MPLS_LABEL=0xFF Each match field combination and value is a distinct match field bucket. For example, IN_PORT=5 is a first match field bucket and IN_PORT=11 is a second match field bucket. Although the buckets have the same match field (i.e., IN_PORT), the buckets have different values for that match field (i.e., "5" and "11").

In addition, it is possible for a packet to match multiple match field buckets and thus be counted in multiple match field buckets. For example, if an IPv4 packet was received from 99.0.0.1 with ETH_SRC=001122-334455 on port 11 with UDP=53, the packet would match each of the following match field buckets: a.ii; b.i; c.i; d.i; and e.i. Thus, each of those match field buckets would be incremented by one. As another example, if an ARP request packet was received from 99.0.0.1 on port 11, the packet would match a.ii; f.i; and g.i, and those buckets would be incremented. None of the other buckets would be incremented because those buckets are specific to IPv4, which is different from the ARP protocol and thus does not yield a match.

At 103, SDN controller 410 may determine whether the rate of packet-in messages received from the network device over a period of time exceeds a threshold. The threshold may be a static value representing a maximum rate of packet-in messages. Alternatively, the threshold may be a derived value based on a maximum consumption/usage percentage of processing resource 421. The maximum rate of packet-in messages may be derived in various ways, such as by examining the fluctuation in utilization of processing resource 421 over time as compared to the rate of packet-in messages received during that time. Additionally, the threshold may be configurable, such as by a network administrator or by the SDN controller itself 410 based on network conditions or policies. If the threshold is exceeded, method 100 proceeds to block 104. If the threshold is not exceeded, method 100 returns to block 101. Of course, blocks 101-102 may also be a continuous process running in parallel with blocks 103-106.

When the threshold is exceeded, method 100 proceeds to block 104 so as to take action to reduce control plane overload on network device 420 by reducing the amount of packet-in processing that network device 420 engages in. The remedial action, referred to herein as filtering, is to identify a portion of network traffic that otherwise would require packet-in processing and divert it from the SDN forwarding pipeline 422 to the non-SDN forwarding pipeline 427. At 104, a match field bucket is selected by balancer 413 of SDN controller 410. The match field bucket may be selected based on various criteria. In an example, it may be desirable to minimize the number of hosts on the network that would be impacted by the filtering.

Method 200 of FIG. 2 may be performed to determine which match field bucket should be selected. Method 200 may be performed by balancer 413 of SDN controller 410. At 201, balancer 413 may determine how many candidate hosts may have sent a flow matching each match field bucket. The candidate hosts may be determined by examining the match fields of each match field bucket and determining how many hosts are capable of sending network flows that would match all of the respective match fields and values for each match field bucket. SDN controller 410 has the capability to do this because it has a global view of the network. At 202, balancer 413 may determine an average number of packet-in messages per candidate host for each match field bucket. This may be accomplished by dividing the number of packet-in messages tracked for the bucket by the number of candidate hosts that were identified. At 203, balancer 413 may select the match field bucket having the highest average number of packet-in messages per candidate host. By doing this, balancer 413 assures that filtering out flows using the selected match field bucket parameters will have the greatest relative impact (i.e., the greatest number of diverted flows) per potentially affected host. In other examples, additional or alternative criteria may be considered in selecting a match field bucket. For example, potential additional criteria includes: the total number of flow rules on the network device 420 (i.e., is the flow table of network device 420 almost full), whether a given match field bucket has been selected for filtering previously (e.g., past offenders may be more likely to be filtered in the future), and whether other filter flow rules already installed on the network device 420 could be amended to be more generic and thus filter out the traffic associated with a given match field bucket.

Returning to method 100, at 105 balancer 413 may generate a filter flow rule 450 with match conditions 451 to match network flows according to match fields associated with the selected match field bucket. The filter flow rule may include wildcard match parameters since the selected match field bucket may not have parameters specified for all matchable fields. For instance, a match field bucket could have IN_PORT as the only field, which means that the ETH_TYPE match field would have a wildcard match parameter. A filter flow rule as used herein is a flow rule meant to divert matching network flows to a non-SDN forwarding pipeline. The action field of the filter flow rule is thus set to divert any matching flows to the non-SDN forwarding pipeline (i.e., divert instruction 452). In the OpenFlow protocol, this is accomplished by setting the destination port to a reserved port called "NORMAL", which is a reserved port that causes network device 420 to send any matching packets through the non-SDN forwarding pipeline 427. The priority of the filter flow rule 450 may be set so that the filter flow rule has a lower priority than other flow rules (i.e., flow rules 424), but a higher priority than the packet-in rule 426. As a result, as network device 420 will attempt to match a received packet 430 in its SDN forwarding pipeline 422, it will attempt to match the packet to all of the normal flow rules 424 before matching it to any filter flow rules 425. Similarly, network device 420 will attempt to match the received packet 430 to any filter flow rules 425 (which will then divert the packet to the non-SDN forwarding pipeline 427) before matching it to the packet-in rule 426 (which would result in the packet being forwarded to the control plane for packet-in processing). In some examples, ordering could be accomplished by other means, such as using multiple tables.

At 106, SDN controller 410 may send the filter flow rule 450 to network device 420 via communication module 414. Network device 420 may then install the filter flow rule 450 in flow table 423 as one of the filter flow rules 425. With the filter flow rule installed, network device 420 will divert any matching flows to the non-SDN forwarding pipeline 427. These diverted flows may then be processed by pipeline 427 using forwarding table 428. Accordingly, the diverted flows will not be subject to packet-in processing, which can reduce the strain on processing resource 421 in the control plane of network device 420. Similarly, this can also reduce the strain on SDN controller 410, since it will not receive packet-in messages from network device 420 for the diverted flows. Furthermore, SDN controller 410 may continue to perform method 100, so that if the rate of packet-in messages still exceeds the threshold, more flows can be diverted based on a different match field bucket. Additionally, in some examples multiple filter flow rules may be generated at a time based on multiple match field buckets.

Eventually, it is likely that the strain on the control plane of network device 420 will be reduced to the point that it is operating within an acceptable range and can sustain a larger amount of packet-in processing. In an example, a timeout value may be set for a given filter flow rule, such that after expiration of the timeout value the filter flow rule is automatically removed by network device 420. The timeout value may be based on a hard limit (e.g., remove filter flow rule after 30 seconds) or may be based on some criteria, such as network activity (e.g., remove filter flow rule after receiving lower than N packets per second for 30 consecutive seconds).

In another example, method 300 of FIG. 3 may be performed to return diverted flows to the SDN forwarding pipeline 422 of network device 420. At 301, filter flow rule tracker 415 of SDN controller 410 may track filter flow rules 450 that have been sent to network device 420. At 302, filter flow rule tracker 415 may obtain flow statistics from network device 420 related to traffic that has been diverted based on any of the filter flow rules over a given period of time. Filter flow rule tracker 415 may use this information to determine, for each filter flow rule, the rate of flows diverted based on the filter flow rule by matching the flows to filter flow rules. At 303, filter flow rule removal module 416 may instruct network device 420 to remove a filter flow rule if removal of the rule would not cause the rate of packet-in messages received from network device 420 over a period of time to exceed a threshold. As before, the threshold may be a static value or derived value. The threshold may be the same as the threshold from method 100, or it may be set lower than the threshold for method 100. The determination may be made by adding the rate of flows diverted based on a respective filter flow rule to the rate of packet-in messages received from the network device 420 over the given period of time, and comparing that combined value to the threshold. Additionally, the filter flow rules may be prioritized for removal by giving priority to filter flow rules having the lowest average number of diverted flows per candidate host. The average number of diverted flows per candidate host for each filter flow rule may be determined in a similar manner as described in blocks 201 and 202 of method 200. Additionally, as described with respect to method 200, other criteria may be considered in prioritizing filter flow rules for removal.

Figure 5:
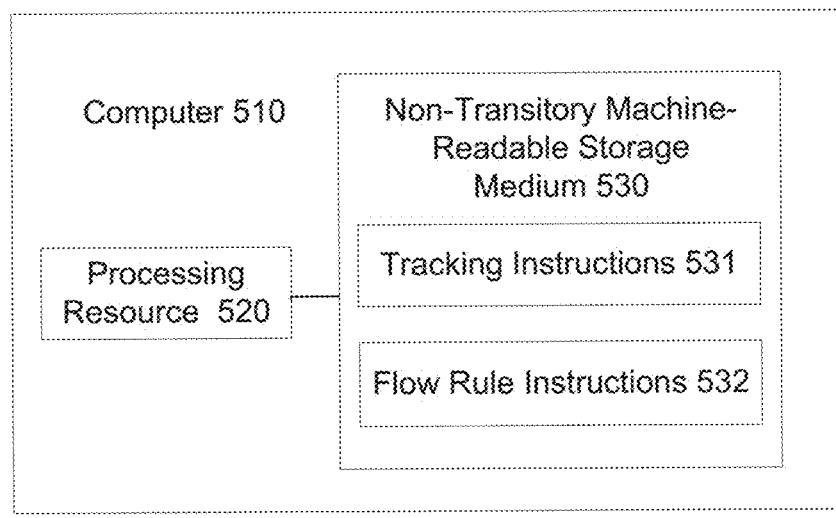
FIG. 5 illustrates an example computer for reducing control plane overload of a network device, according to an example.

FIG. 5 illustrates a computer to reduce control plane overload of a network device, according to an example. Computer 510 may be part of SDN controller 510. The computer may include one or more processing resources and one or more machine-readable storage media, as described with respect to SDN controller 410, for example.

Processing resource 520 may be at least one central processing unit (CPU), at least one semiconductor-based microprocessor, other hardware devices or processing elements suitable to retrieve and execute instructions stored in machine-readable storage medium 530, or combinations thereof. Processing resource 520 can include single or multiple cores on a chip, multiple cores across multiple chips, multiple cores across multiple devices, or combinations thereof. Processing resource 520 may fetch, decode, and execute instructions 531, 532 among others, to implement various processing. As an alternative or in addition to retrieving and executing instructions, processing resource 520 may include at least one integrated circuit (IC), other control logic, other electronic circuits, or combinations thereof that include a number of electronic components for performing the functionality of instructions 531, 532. Accordingly, processing resource 520 may be implemented across multiple processing units, and instructions 531, 532 may be implemented by different processing units in different areas of computer 510.

Machine-readable storage medium 530 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 530 can be computer-readable and non-transitory. Machine-readable storage medium 530 may be encoded with a series of executable instructions for managing processing elements.

The instructions 531, 532 when executed by processing resource 520 (e.g., via one processing element or multiple processing elements of the processing resource) can cause processing resource 520 to perform processes, for example, methods 100-300, and/or variations and portions thereof. Instructions 531, 532 will now be briefly described, which description should be read in light of the description of methods 100-300 and environment 400 above.

Computer 510 may be an SDN controller and may reduce control plane overload of a network device, such as a switch. Tracking instructions 531 when executed by processing resource 520 may cause computer 510 to track packet-in messages received from a controlled switch. Flow rule instructions 532 when executed by processing resource 520 may cause computer 510 to, in response to a rate of packet-in messages received from the controlled switch exceeding a threshold, send a flow rule to the controlled switch to divert a subset of unmatched flows to a non-SDN forwarding pipeline of the controlled switch. The flow rule may be generated in accordance with the techniques described earlier to generate filter flow rules based on match key buckets. The controlled switch may install the flow rule into a flow table of the switch's SDN forwarding pipeline. The installed flow rule then causes the switch to divert any network flows matching the flow rule to a non-SDN forwarding pipeline of the switch. Accordingly, the switch will no longer generate packet-in messages for network flows matching the flow rule since flows matching the flow rule will be sent to the non-SDN forwarding pipeline for processing and forwarding.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, the specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. A method for reducing control plane overload of a switch, comprising, by a software defined network (SDN) controller:
   counting packet-in messages received from a switch, the switch having an SDN forwarding pipeline and a non-SDN forwarding pipeline;
   classifying each packet-in message into a match field bucket, the match field bucket matching flows based on at least one field of the packet-in message; and
   if the rate of packet-in messages received from the switch over a time period exceeds a threshold,
      selecting a match field bucket;
      generating a filter flow rule to match flows according to the at least one field of the selected match field bucket, wherein the filter flow rule causes any matched flows to be diverted to a non-SDN forwarding pipeline of the switch; and
      sending the filter flow rule to the switch.

2. The method of claim 1, wherein the threshold is configurable.

3. The method of claim 1, wherein the period of time is a sliding window period of time.

4. The method of claim 1, wherein a packet-in message may be classified into multiple match field buckets based on different combinations of match fields.

5. The method of claim 1, further comprising:
   for each match field bucket,
      determine how many candidate hosts may have sent a flow matching the bucket, and
      determine an average number of packet-in messages per candidate host;
   wherein the match field bucket that is selected is the match field bucket having the highest average number of packet-in messages per candidate host.

6. The method of claim 1, further comprising tracking all filter flow rules that have been sent to the switch.

7. The method of claim 6, further comprising:
   obtaining flow statistics from the switch related to flows that have been diverted based on any of the filter flow rules to determine a rate of diverted flows per filter flow rule; and
   for each filter flow rule, if the rate of packet-in messages received from the switch over the period of time combined with the rate of diverted flows over the period of time is less than a second threshold, instructing the switch to remove the respective filter flow rule.

8. The method of claim 7, wherein the threshold and the second threshold are the same value.

9. The method of claim 7, wherein the filter flow rules that have the lowest average number of diverted flows per candidate host are instructed to be removed first.

10. A controller in a software defined network (SDN) to reduce control plane overload of a controlled switch, comprising:
   a global counter to count a total number of packet-in messages received from a controlled switch;
   multiple match field bucket counters each with match conditions, each match field bucket counter counting the number of packet-in messages received from the controlled switch that match the match conditions;
   a balancer to, in response to a rate of packet-in messages received from the controlled switch over a period of time exceeding a threshold:
      select a match field bucket; and
      generate a filter flow rule with the match conditions of the selected match field bucket and with an action to divert any matching packets to a non-SDN forwarding pipeline of the controlled switch; and a communication module to send the filter flow rule to the controlled switch.

11. The controller of claim 10, wherein the balancer is to:

determine how many candidate hosts may have sent a flow matching the bucket, and determine an average number of packet-in messages per candidate host;

wherein the match field bucket that is selected is the match field bucket having the highest average number of packet-in messages per candidate host.

12. The controller of claim 10, further comprising:

a filter flow rule tracker to obtain flow statistics from the controlled switch related to flows that have been diverted based on any filter flow rule to determine a rate of diverted flows per filter flow rule; and a filter flow removal module to instruct the controlled switch to remove a filter flow rule if the rate of packet-in messages combined with the rate of diverted flows for the filter flow rule is less than a second threshold.

13. The controller of claim 12, wherein the filter flow removal module selects for removal a filter flow rule having the lowest average number of diverted flows per candidate host.

14. The controller of claim 10, wherein the period of time is a sliding window period of time.

15. A non-transitory computer-readable storage medium storing instructions for reducing control plane overload of a controlled switch that, when executed by a processing resource of an SDN controller, cause the processing resource to:

track packet-in messages received from a controlled switch; and in response to a rate of packet-in messages received from the controlled switch exceeds a threshold, send a flow rule to the controlled switch to divert a subset of unmatched flows to a non-SDN forwarding pipeline of the controlled switch.

* * * * *